(12) United States Patent
    Egolf et al.

(10) Patent No.: US 10,384,186 B2
(45) Date of Patent: Aug. 20, 2019

(54) FIRED HEATER APPARATUS AND METHOD OF SELECTING AN APPARATUS ARRANGEMENT

(71) Applicant: UOP LLC, Des Plaines, IL (US)

(72) Inventors: Bryan J. Egolf, Crystal Lake, IL (US); Kurt M. Vanden Bussche, Lake in the Hills, IL (US); William M. Hartman, Des Plaines, IL (US); Pengfei Chen, Glenview, IL (US); Ka Lok, Buffalo Grove, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/987,828

(22) Filed: May 23, 2018

(65) Prior Publication Data

US 2018/0264426 A1    Sep. 20, 2018

Related U.S. Application Data

(63) Continuation of application No. PCT/US2016/061030, filed on Nov. 9, 2016.

(60) Provisional application No. 62/260,918, filed on Nov. 30, 2015.

(51) Int. Cl.
    *B01J 19/00*      (2006.01)
    *F23C 5/08*       (2006.01)
    *B01J 19/24*      (2006.01)
    *F23D 14/12*      (2006.01)
    *F23D 23/00*      (2006.01)

(52) U.S. Cl.
    CPC ......... *B01J 19/0013* (2013.01); *B01J 19/245* (2013.01); *F23C 5/08* (2013.01); *F23D 14/125* (2013.01); *F23D 23/00* (2013.01); *B01J 2219/00157* (2013.01)

(58) Field of Classification Search
    CPC ........ B01J 8/0285; B01J 8/087; B01J 8/0496; B01J 19/0013; B01J 19/245; B01J 2208/00504; B01J 2208/00176; B01J 2208/00203; B01J 2219/00157
    See application file for complete search history.

(56) References Cited

U.S. PATENT DOCUMENTS

2008/0110801 A1 *  5/2008  Yuan ...................... C10G 35/02
                                                              208/63

* cited by examiner

Primary Examiner — Lessanework Seifu

(57) ABSTRACT

Radiant fired heaters used with reactors are described. The apparatus includes at least two sets of radiant fired heaters, the first set being at a second height less than the first height. Each set of radiant fired heaters comprises at least one radiant fired heater. Each radiant fired heater has at least one process coil disposed within the heater, burners, and a flue gas outlet. There is at least one inlet manifold having an inlet and multiple outlets, with each outlet of the inlet manifold in fluid communication with one process coil inlet. There is an outlet manifold having multiple inlets and an outlet, with the multiple inlets in fluid communication with the process coil outlets. A method of selecting a reforming apparatus arrangement is also described.

20 Claims, 14 Drawing Sheets

FIRED HEATER APPARATUS AND METHOD OF SELECTING AN APPARATUS ARRANGEMENT

CROSS-REFERENCE TO RELATED APPLICATIONS

This application is a Continuation of copending International Application No. PCT/US2016/061030 filed Nov. 9, 2016, which application claims priority from U.S. Provisional Application No. 62/260,918 filed Nov. 30, 2015, the contents of which cited applications are hereby incorporated by reference in their entirety.

BACKGROUND OF THE INVENTION

Hydrocarbon conversion processes often employ multiple reaction zones through which hydrocarbons pass in a series flow. Each reaction zone in the series often has a unique set of design requirements. A minimum design requirement of each reaction zone in the series is the hydraulic capacity to pass the desired throughput of hydrocarbons. An additional design requirement of each reaction zone is sufficient heating to perform a specified degree of hydrocarbon conversion.

One well-known hydrocarbon conversion process is catalytic reforming. Generally, catalytic reforming is a well-established hydrocarbon conversion process employed in the petroleum refining industry for improving the octane quality of hydrocarbon feedstocks. The primary products of reforming are a motor gasoline blending component or aromatics for petrochemicals. Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. A reforming feedstock can be a hydrocracker, straight run, FCC, or coker naphtha, and it can contain many other components such as a condensate or thermal cracked naphtha.

Heaters or furnaces are often used in hydrocarbon conversion processes, such as reforming, to heat the process fluid before it is reacted. The heaters can be located before the first reaction zone and/or between reaction zones. Generally, most of the fired heaters or furnaces have a U-tube configuration with end fired burners. The fired heater box typically contains 3 or 4 cells made up of the charge heater and 2 or 3 interheaters. The fired heater cells are typically arranged in row at the same height. However, this arrangement takes up a lot of space, increasing the cost of the plant.

Therefore, there is a need for improved arrangements of fired heaters.

SUMMARY OF THE INVENTION

One aspect of the invention involves an apparatus. In one embodiment, the apparatus includes at least two sets of radiant fired heaters, the first set of radiant fired heaters being at a first height, the second set of radiant fired heaters being at a second height less than the first height, each set of radiant fired heaters comprising at least one radiant fired heater, each radiant fired heater having at least one process coil disposed within the radiant fired heater, burners, and a flue gas outlet, wherein the process coils have one outlet and at least one inlet; at least one inlet manifold having an inlet and multiple outlets, with each outlet of the at least one inlet manifold in fluid communication with one process coil inlet; and an outlet manifold having multiple inlets and an outlet, with the multiple inlets of the outlet manifold in fluid communication with the process coil outlets.

Another aspect of the invention involves a method of selecting an apparatus arrangement. In one embodiment, the method involves selecting a first arrangement of reactors, selecting a first arrangement of stacked sets of radiant fired heaters based on the first arrangement of reactors; and selecting a first tube laydown area based on the first arrangement of stacked sets of radiant fired heaters. The first hydrocarbon exclusion zone area is determined based on the first arrangement of stacked sets of radiant fired heaters. A second arrangement of reactors, a second arrangement of stacked sets of radiant fired heaters based on the second arrangement of reactors, and a second tube laydown area based on the second arrangement of stacked sets of radiant fired heaters are selected. The second hydrocarbon exclusion zone area is determined based on the second arrangement of stacked sets of radiant fired heaters. The first tube laydown area is compared to the second tube laydown area and the first hydrocarbon exclusion zone area is compared to the second hydrocarbon exclusion zone area. The apparatus arrangement is selected based on the first and second tube laydown areas and the first and second hydrocarbon exclusion zone areas.

DETAILED DESCRIPTION OF THE INVENTION

The present invention provides novel arrangements of radiant fired heaters which reduce the amount of space needed for the radiant fired heaters. Reducing the area occupied by the radiant fired heaters reduces the capital cost as less overall space is needed for the plant. These arrangements also reduce the piping equivalent length between the reaction zones and the radiant fired heaters, which also helps to reduce capital costs.

A catalytic conversion zone generally includes a plurality of reaction zones and a plurality of radiant fired heaters. The hydrocarbon stream passes from one reaction zone through a radiant fired heater and into another reaction zone. There is a radiant fired heater between any reaction zones in series. There will typically be a radiant fired heater before the first reaction zone to heat the incoming stream. There can be three, four, five, or more reaction zones and three, four, five, or more radiant fired heaters.

Generally, a catalytic conversion of a hydrocarbon-containing reactant stream in a reaction system has at least two reaction zones where the reactant stream flows serially through the reaction zones. Reaction systems having multiple zones generally take one of two forms: a side-by-side form or a stacked form. In the side-by-side form, multiple and separate reaction vessels, each that can include a reaction zone, may be placed next to each other in a row. In the stacked form, one common reaction vessel can contain multiple and separate reaction zones that may be placed on top of each other. In both reaction systems, there can be intermediate heating or cooling between the reaction zones, depending on whether the reactions can be endothermic or exothermic.

Figure 1A:
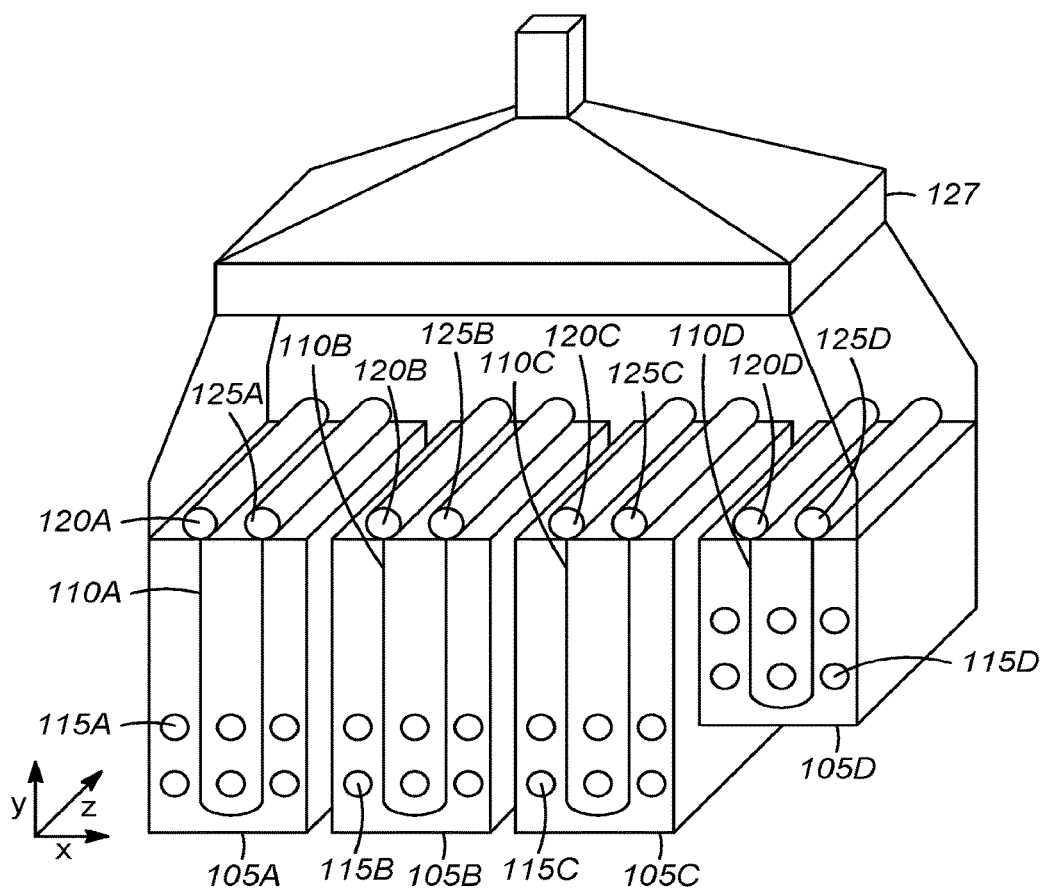
FIGS. 1A-1B illustrate a perspective view of one embodiment of a conventional fired heater box of the prior art and a plan view of a reforming plant using the conventional fired heater box of FIG. 1A.
Figure 1B:
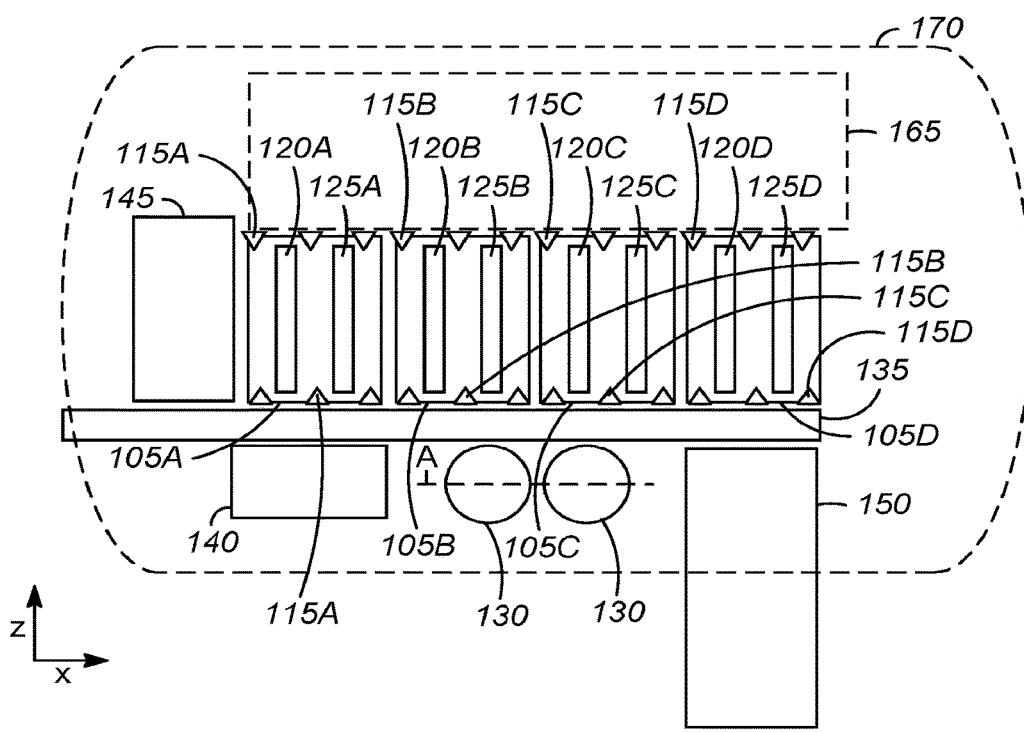

FIGS. 1A-B illustrate a conventional arrangement of heaters for a reactor zone. In this embodiment, there are four radiant fired heaters 105A, 105B, 105C, and 105D positioned next to each other in a row in the x direction.

Each of the radiant fired heaters 105A-D includes a series of process coils 110A-D and burners 115A-D on each end of the process coils 110A-D. Each process coil 110A-D is generally U-shaped and has an inlet and an outlet.

Each of the radiant fired heaters 105A-D has an inlet manifold 120A-D with an inlet and multiple outlets, and an outlet manifold 125A-D with multiple inlets and an outlet.

The flue gas from the radiant fired heaters 105A-D is routed upward through ducts and enters a convection bank 127 for heat recovery. The convection bank 127 has an inlet in fluid communication with the flue gas outlet from the radiant fired heater. The convection bank 127 includes heating tubes inside the convection bank 127 for passing a fluid to be heated. The convection bank 127 recovers heat from the flue gases which exit the radiant fired heaters at temperatures between 700° C. and 1100° C. One method of heat recovery is passing water through the heating tubes to generate steam. The convection bank 127 extends in the x direction and is perpendicular to the direction (z) of the inlet manifolds 120A-D and the outlet manifold 125A-D.

In the layout illustrated in FIG. 1B, there are two reactor stacks 130. As shown, each reactor stack 130 includes one reactor stacked on top of another reactor. One reactor stack 130 includes reactors 1 and 2, and the other reactor stack 130 includes reactors 3 and 4.

The inlet of the inlet manifolds 120A-D is in fluid communication with the outlet of one of the reactors in reactor stacks 130, and the multiple outlets of the inlet manifolds 120A-D are in fluid communication with the inlets of the process coils 110A-D.

The outlets of the process coils 110A-D are in fluid communication with the multiple inlets of the outlet manifolds 125A-D, and the outlet of the outlet manifolds 125A-D is in fluid communication with the inlet to the next reactor in the series of reactors in the reactor stacks 130.

The inlet manifolds 120A-D and the outlet manifolds 125A-D extend in the z direction and are perpendicular to a plane A extending through the two reactor stacks 130.

There is a pipe rack 135, which is a section of common piping supports which are used for the various piping and instrumentation for the process unit.

There is a fuel gas treatment system 140. The fuel gas treatment system 140 generally includes multiple coil sections that heat boiler feed water, generate steam, and superheat the steam to provide high pressure steam for use in the refinery.

There is a steam disengaging system 145. Typically, the steam disengaging system 145 includes a drum for separating the steam generated within the heater from the circulating water. Generally, the water is not completely vaporized to prevent corrosion on the steam generation coils. The vapor-liquid mixture is passed through the disengaging drum. The water is then re-circulated through the steam generation coils. The vapor is returned through a steam superheating section of coils and sent to the refinery.

There is a circulating catalyst regeneration structure 150. The catalyst is sent to the circulating catalyst regeneration structure 150 to burn off the coke formed in the reformer.

There is a tube laydown yard 165, which is a space reserved for building and maintaining the heaters. It typically covers the same area (length and width (x and z directions)) as the radiant fired heaters 105A-D.

There is also a hydrocarbon exclusion zone area 170 surrounding the radiant fired heaters 105A-D in which process equipment with flammable mixtures cannot be positioned. It is typically about a 50 foot radius around the heaters.

Figure 2A:
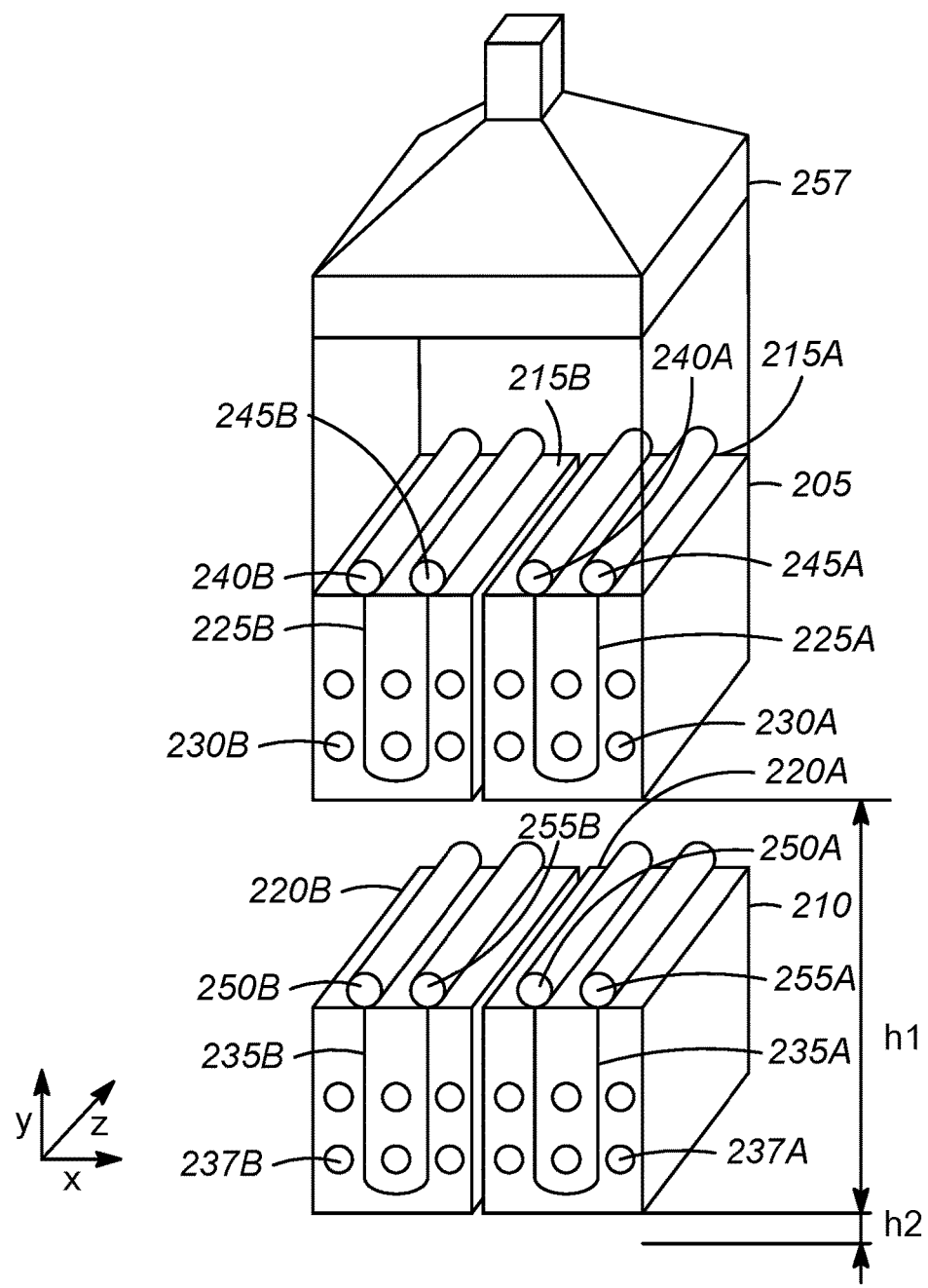
FIGS. 2A-2C illustrate a perspective view of one embodiment of a fired heater box according to the present invention and two plan views of a reforming plant using the fired heater box of FIG. 2A.
Figure 2B:
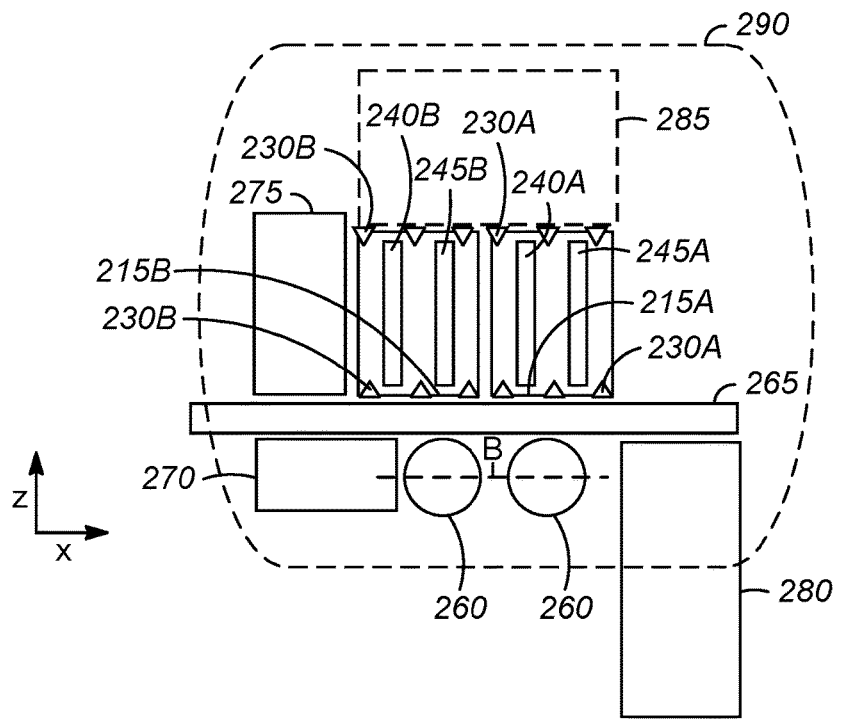
Figure 2C:
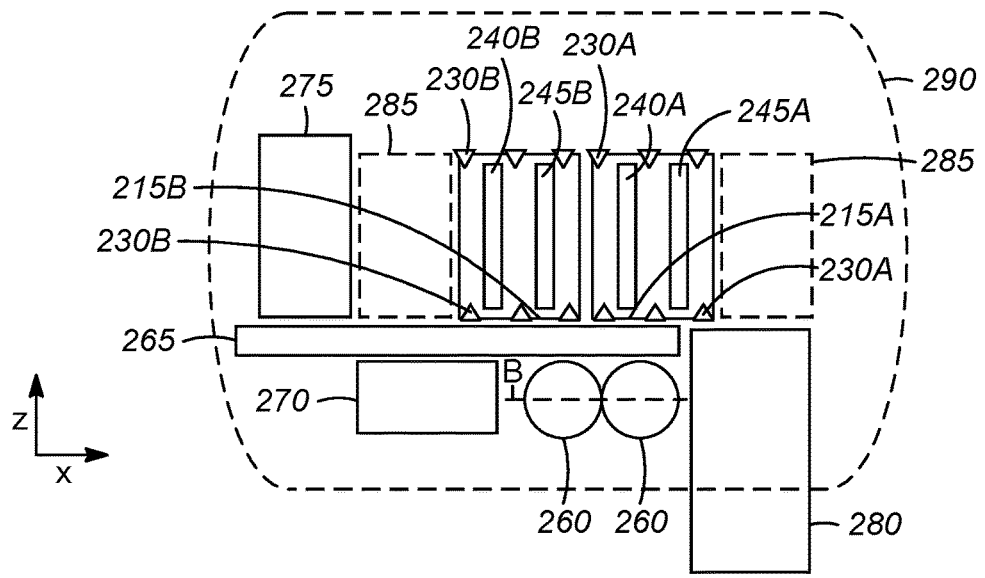

FIGS. 2A-C illustrate one embodiment of the radiant fired heaters of the present invention. In this arrangement, there are two sets 205, 210 of radiant fired heaters 215A-B, and 220A-B. Each set 205, 210 has at least one radiant fired heater. There are generally at least two or more radiant fired heaters in each set 205, 210. The number of radiant fired heaters will vary depending on the number of reactors and the heating requirements of the process.

The first set 205 is at a height $h_1$ (y direction) greater than the height $h_2$ of the second set 210. The second set 210 of radiant fired heaters 220A-B is generally on the ground.

The radiant fired heaters 215A-B have U-shaped process coils 225A-B and burners 230A-B, while radiant fired heaters 220A-B have u-shaped process coils 235A-B and burners 237A-B. There are burners 230A-B and 237A-B at both ends of the series of process coils 225A-B and 235A-B. In this embodiment, the convection bank 257 extends in the x direction and is perpendicular to the direction (z) of the inlet manifolds 240A-B, 250A-B and outlet manifolds 245A-B, 255A-B. The flue gas from the second set 210 of radiant fired heaters 220A-B is directed to the bottom of the first set 205 of radiant fired heaters 215A-B, and from there to the convection bank 257. Alternatively, the flue gas from the second set 210 could be sent around the outside of the radiant fired heaters 215A-B of the first set 205 to the convection bank 257, or between the radiant fired heaters 215A-B to the convection bank 257.

There are two reactor stacks 260 (each with two reactors), a pipe rack 265, a fuel gas treatment system 270, a steam disengaging system 275, a circulating catalyst regeneration structure 280, and a tube laydown yard 285.

In this embodiment, the inlet manifolds 240A-B, 250A-B and outlet manifolds 245A-B, 255A-B extend in the z direction and are perpendicular to a plane B extending through the two reactor stacks 260.

In this embodiment, the area of tube laydown yard 285 is about one half the area of the conventional side-by-side arrangement. The hydrocarbon exclusion zone area 290 surrounding the two sets 205, 210 of radiant fired heaters 215A-B and 220A-B is also smaller than in the conventional arrangement.

FIG. 2C illustrated an alternate arrangement for the tube laydown yard 285. In this embodiment, the tube laydown yard 285 is on both sides on the radiant fired heaters 215A-B.

Figure 3A:
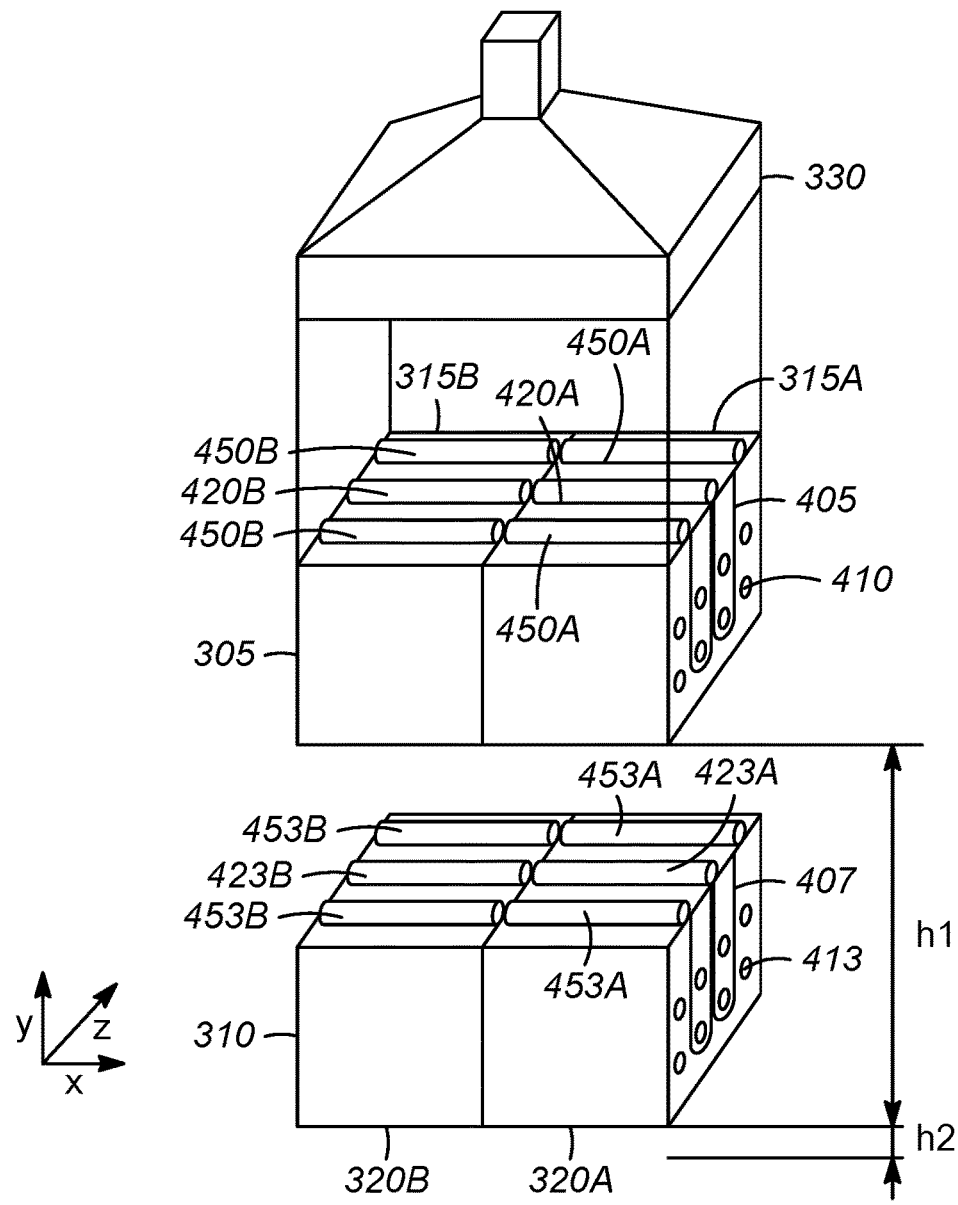
FIGS. 3A-3B illustrate a perspective view of another embodiment of a fired heater box according to the present invention and a plan view of a reforming plant using the fired heater box of FIG. 3A.
Figure 3B:
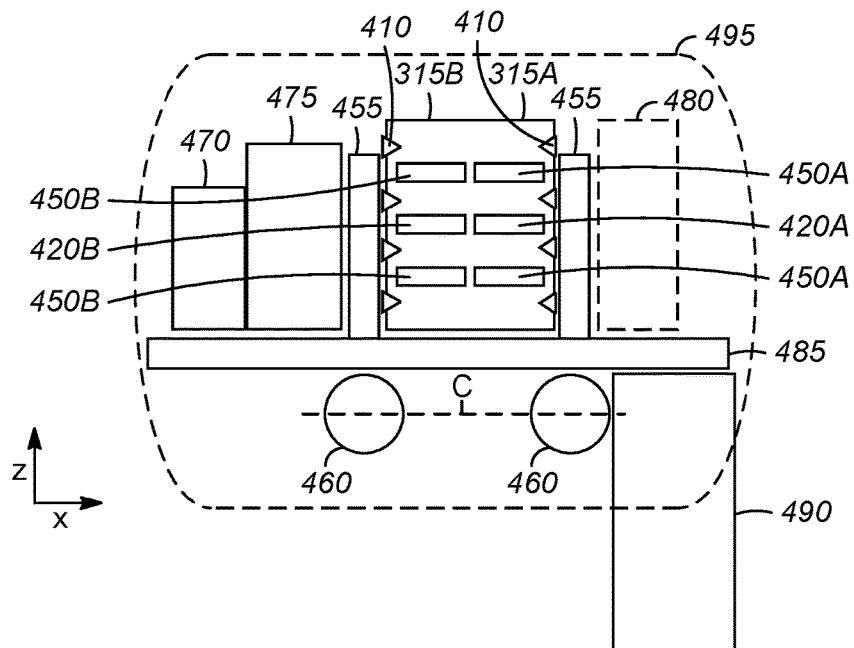

FIGS. 3A-B and 4 illustrate another embodiment of the radiant fired heaters of the present invention. In this arrangement, there are two sets 305, 310 of radiant fired heaters 315A-B, and 320A-B. Each set 305, 310 has at least one radiant fired heater. There are generally at least two or more radiant fired heaters in each set 305, 310. The number of heaters will vary depending on the number of reactors and the heating requirements of the process.

The first set 305 is at a height $h_1$ (y direction) greater than the height $h_2$ of the second set 310. The second set 310 of radiant fired heaters 320A-B is generally on the ground.

Figure 4A:
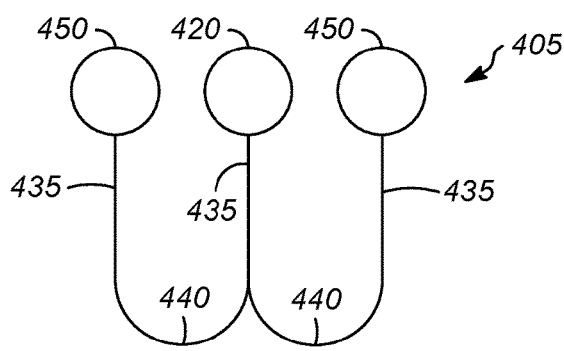
FIGS. 4A-B illustrate two embodiments of W-shaped process tubes for a fired heater.
Figure 4B:
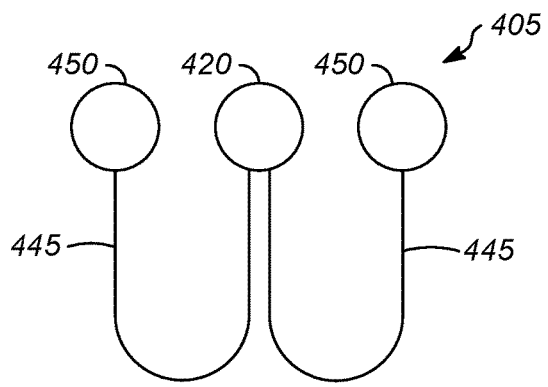

The radiant fired heaters 315A-B, 320A-B include at least one process coil 405, 407 disposed within the radiant fired heaters 315A-B, 320A-B. The radiant fired heaters 315A-B, 320A-B include burners 410. As shown in FIG. 4A, each process coil 405 has a configuration of three tubes 435 in a substantially parallel orientation, and two curved tubular sections 440 connecting the three tubes 435 to form a process coil 405 having a substantially W-shape. The outside tubes may be smaller than the center tube. Process coils 407 are similar. Alternatively, a W-shaped coil could be formed with two U-shaped coils 445 in which the outlets of the coils 445 merge at the inlet of the outlet manifold 420, as shown in FIG. 4B.

There is at least one outlet manifold 420 having an inlet in fluid communication with the outlet of each process coil 405. The outlet manifold 420 includes an outlet for passing the process stream to a downstream reactor.

In some embodiments, there are two inlet manifolds 450 with inlets to receive a process stream from an upstream reactor and outlets in fluid communication with the inlets of each process coil 405.

The inlet manifolds 450A and outlet manifold 420A of the radiant fired heater 315A extend in the x direction and align end to end with the inlet manifolds 450B and outlet manifold 420B of the radiant fired heater 315B. The inlet manifolds 453A and outlet manifold 423A of the radiant fired heater 320A extend in the x direction and align end to end with the inlet manifolds 453B and outlet manifold 423B of the radiant fired heater 320B. The burners 410, 413 are only on one end of the radiant fired heaters 315A-B, 320A-B, the outside end, of the series of process coils 405, 407.

In this embodiment, as shown in FIG. 3B, the reactor piping 455 for the radiant fired heaters 315A-B is on the outside ends of the radiant fired heaters 315A-B (the end where the burners 410 are located).

The use of this W-shaped process coil 405 allows for a more narrow (x direction) radiant fired heaters 315A-B, 320A-B. In addition, the use of the W-shaped process coil 405 allows for bringing the outlet manifold 420 closer to the radiant fired heater process coil outlets.

By redesigning the radiant fired heaters 315, 320, the heating volume is reduced and the width of the radiant fired heaters 315A-B, 320A-B is reduced, and the footprint, or area, of the radiant fired heaters 315A-B, 320A-B is reduced.

The convection bank 330 extends in the x direction and is parallel to the inlet manifolds 450A-B and outlet manifolds 420A-B.

In this embodiment, the two reactor stacks 460 are spaced apart from each other. The inlet manifolds 450A-B and outlet manifolds 420A-B are parallel to a plane C extending through the two reactor stacks 460.

The fuel gas treatment system 470 is next to the steam disengaging system 475 which is next to the radiant fired heaters 315A-B. The tube laydown yard 480 is on the opposite side of the radiant fired heaters 315A-B. These are on the opposite side of the pipe rack 485 from the reactors stacks 460. The circulating catalyst regeneration structure 490, is on the same side of the pipe rack 485 as the reactor stacks 460.

In this embodiment, the area of tube laydown yard 480 is smaller than the tube laydown yard 285 in FIG. 2B because the radiant fired heaters 315A-B are narrower (in the x direction) than the radiant fired heaters 215A-B are (in the z direction).

The hydrocarbon exclusion zone area 495 surrounding the two sets 305, 310 of radiant fired heaters 315A-B and 320A-B is smaller than in the conventional arrangement.

Figure 5A:
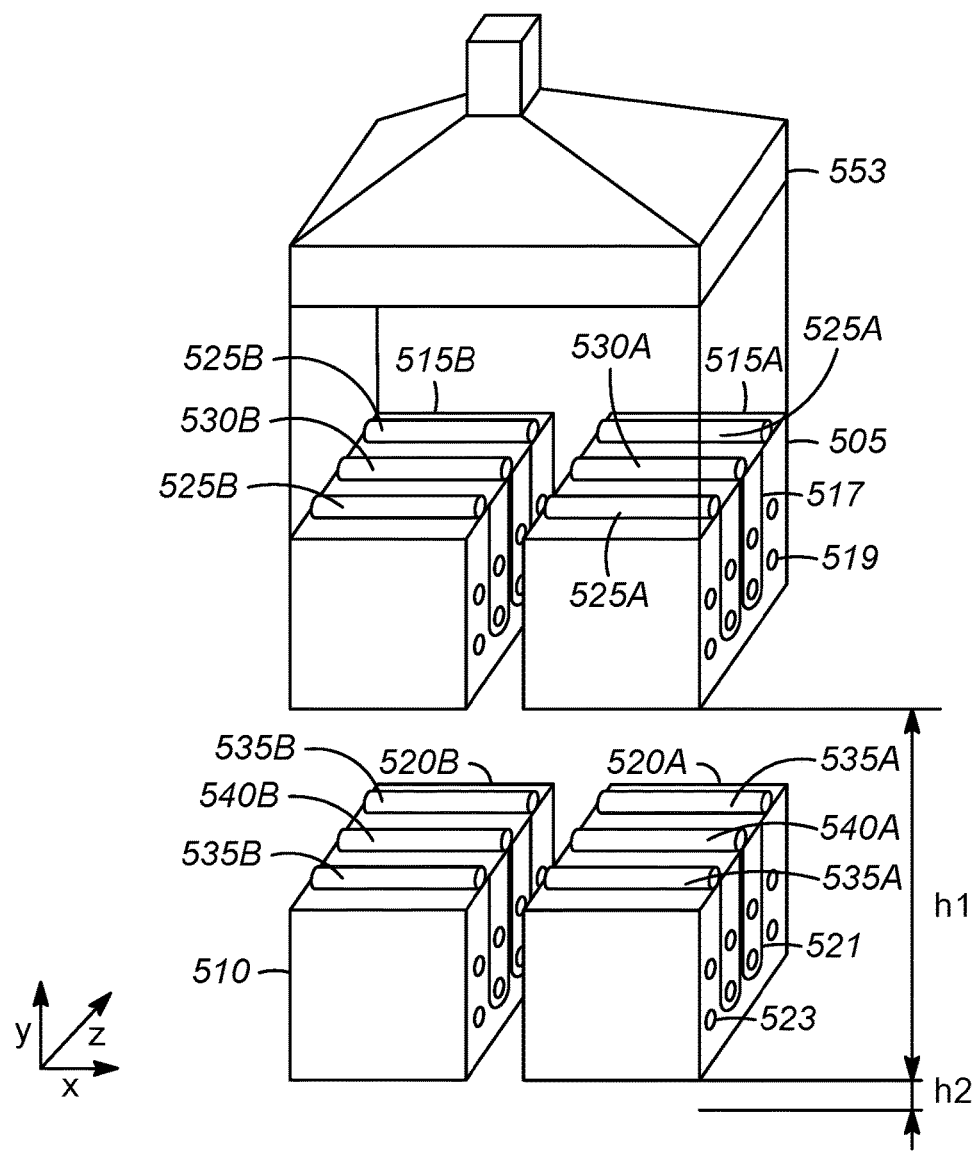
FIGS. 5A-5B illustrate a perspective view of another embodiment of a fired heater box according to the present invention and a plan view of a reforming plant using the fired heater box of FIG. 5A.
Figure 5B:
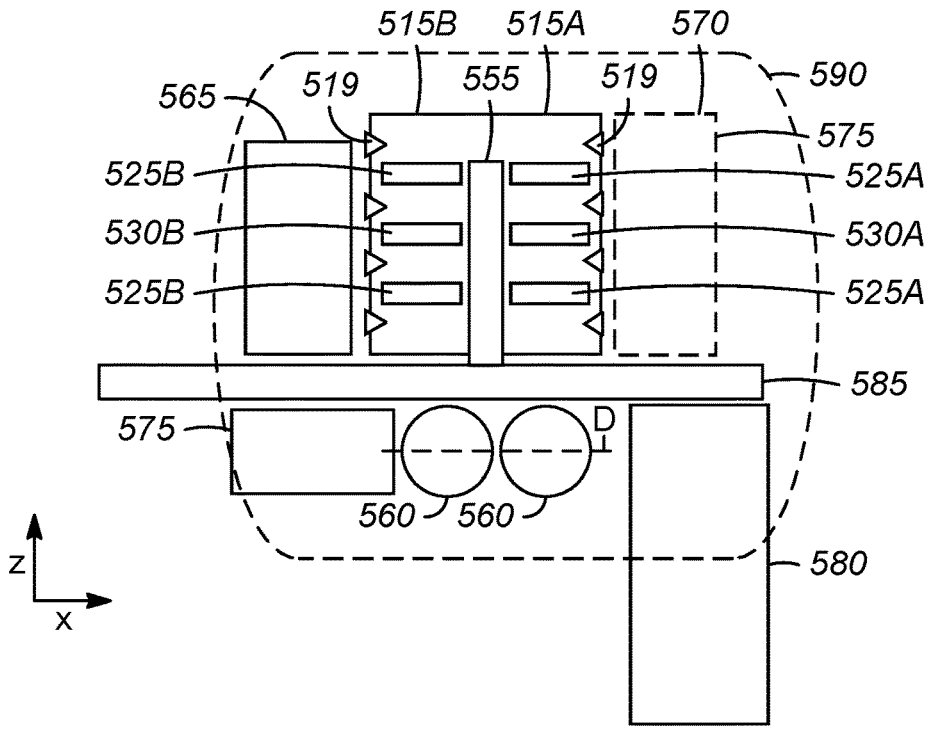

FIGS. 5A-B illustrate another embodiment of the radiant fired heaters of the present invention. In this arrangement, there are two sets 505, 510 of radiant fired heaters 515A-B, and 520A-B. Each set 505, 510 has at least one radiant fired heater.

The first set 505 is at a height $h_1$ (y direction) greater than the height $h_2$ of the second set 510.

The radiant fired heaters 515A-B, 520A-B use the process coils shown in FIG. 4.

The radiant fired heaters 515A-B have inlet manifolds 525A-B and outlet manifolds 530A-B, and radiant fired heaters 520A-B have inlet manifolds 535A-B and outlet manifolds 540A-B. The radiant fired heaters 515A-B have process coils 517 and burners 519, and radiant fired heaters 520A-B have process coils 521A-B and burners 523.

The convection bank 553 extends in the x direction and is parallel to the inlet manifolds 525A-B and outlet manifolds 530A-B.

In this embodiment, the inlet manifolds 525A and outlet manifold 530A of the radiant fired heater 515A extend in the x direction and align end to end with the inlet manifolds 525B and outlet manifold 530B of the radiant fired heater 515B. The burners 519 are only on one end of the radiant fired heaters 515A-B, the outside end, of the series of process coils 517.

In this embodiment, the reactor piping 555 is between the radiant fired heaters 515A and 515B at the end opposite the burners 519.

The reactor stacks 560 are next to each other. The inlet manifolds 525A-B and outlet manifolds 530A-B are parallel to a plane D extending through the reactor stacks 560.

The steam disengaging system 565 is on the opposite side of the radiant fired heaters 515A-B from the tube laydown yard 570.

The fuel gas treatment system 575, and the circulating catalyst regeneration structure 580, are on the same side of the pipe rack 585 as the reactor stacks 560.

The area of tube laydown yard 570 is the same as the tube laydown yard 480 in FIG. 3B.

The hydrocarbon exclusion zone area 590 surrounding the two sets 505, 510 of radiant fired heaters 515A-B and 520A-B is smaller than in the conventional arrangement.

In the previous illustrations, all of the process coils extend downward (y direction) from the inlet and outlet manifolds.

Figure 6A:
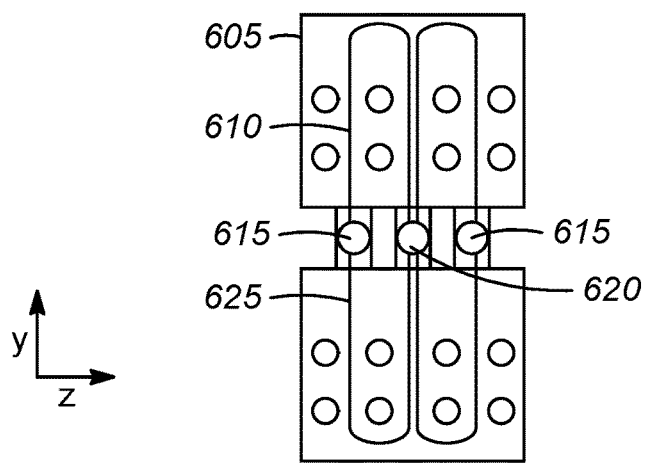
FIGS. 6A-B illustrate embodiments of a fired heater box according to the present invention.

However, this is not required. FIG. 6A illustrates an embodiment of a radiant fired heater 605 in which some of the process coils 610 extend upward (y direction) from the inlet manifolds 615 and outlet manifold 620, and some of the process coils 625 extend downward (y direction) from the inlet manifolds 615 and outlet manifold 620.

Figure 6B:
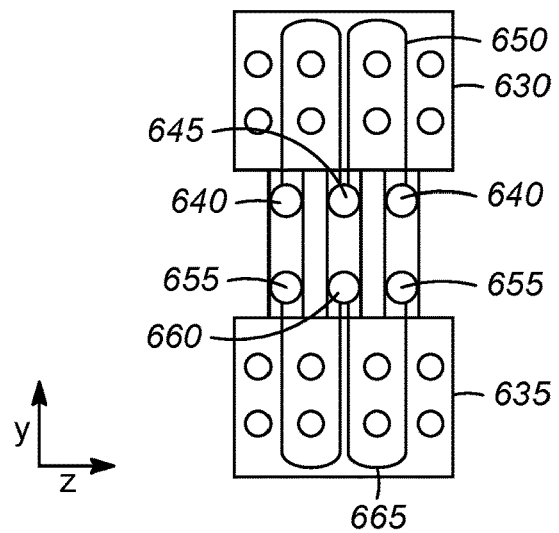

FIG. 6B illustrates an embodiment in which there are first and second sets 630, 635 of radiant fired heaters (only one heater in each set shown). The inlet manifolds 640 and outlet manifold 645 of the first set 630 are positioned on the bottom of the first set 630 of radiant fired heaters. The process coils 650 extend upward (y direction) from the inlet manifolds 640 and outlet manifold 645 of the first set 630. The inlet manifolds 655 and outlet manifold 660 of the second set 635 are positioned on the top of the second set 635 of radiant fired heaters. The process coils 665 extend downward (y direction) from the inlet manifolds 655 and outlet manifold 660 of the second set 635.

Figure 7:
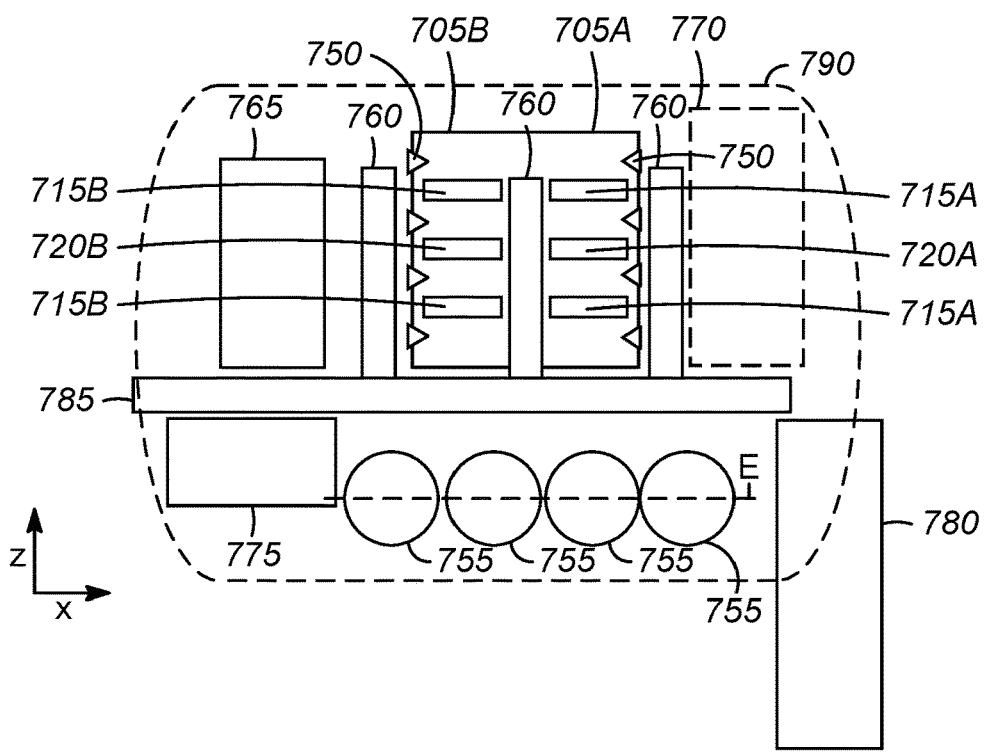
FIG. 7 illustrates a plan view of a reforming plant using the fired heater box of FIG. 7A.

FIG. 7 illustrates a plan view of another embodiment of reaction zone. In this embodiment, the inlet manifolds 715A and outlet manifold 720A of the radiant fired heaters 705A extend in the x direction and align end to end with the inlet manifolds 715B and outlet manifold 720B of the radiant fired heaters 705B. The burners 750 are on one end of the series of process coils on the outside ends.

There are four reactors 755 extending in the x direction. The inlet manifolds 715A-B and outlet manifolds 720A-B extend in the x direction and are parallel to a plane E extending through the four reactors 755.

There is reactor piping 760 on the outside ends of the radiant fired heaters 705A-B (near the burners 750) as well as between the radiant fired heaters 705A-B.

The steam disengaging system 765 is on the opposite side of the radiant fired heaters 705A-B from the tube laydown yard 770.

The fuel gas treatment system 775 and the circulating catalyst regeneration structure 780 are on the same side of the pipe rack 785 as the reactors 755.

The hydrocarbon exclusion zone area 790 surrounding the two sets of radiant fired heaters 705A-B is smaller than in the conventional arrangement. The reactor piping requirements are shorter, and the pipe racks are also shorter.

Figure 8A:
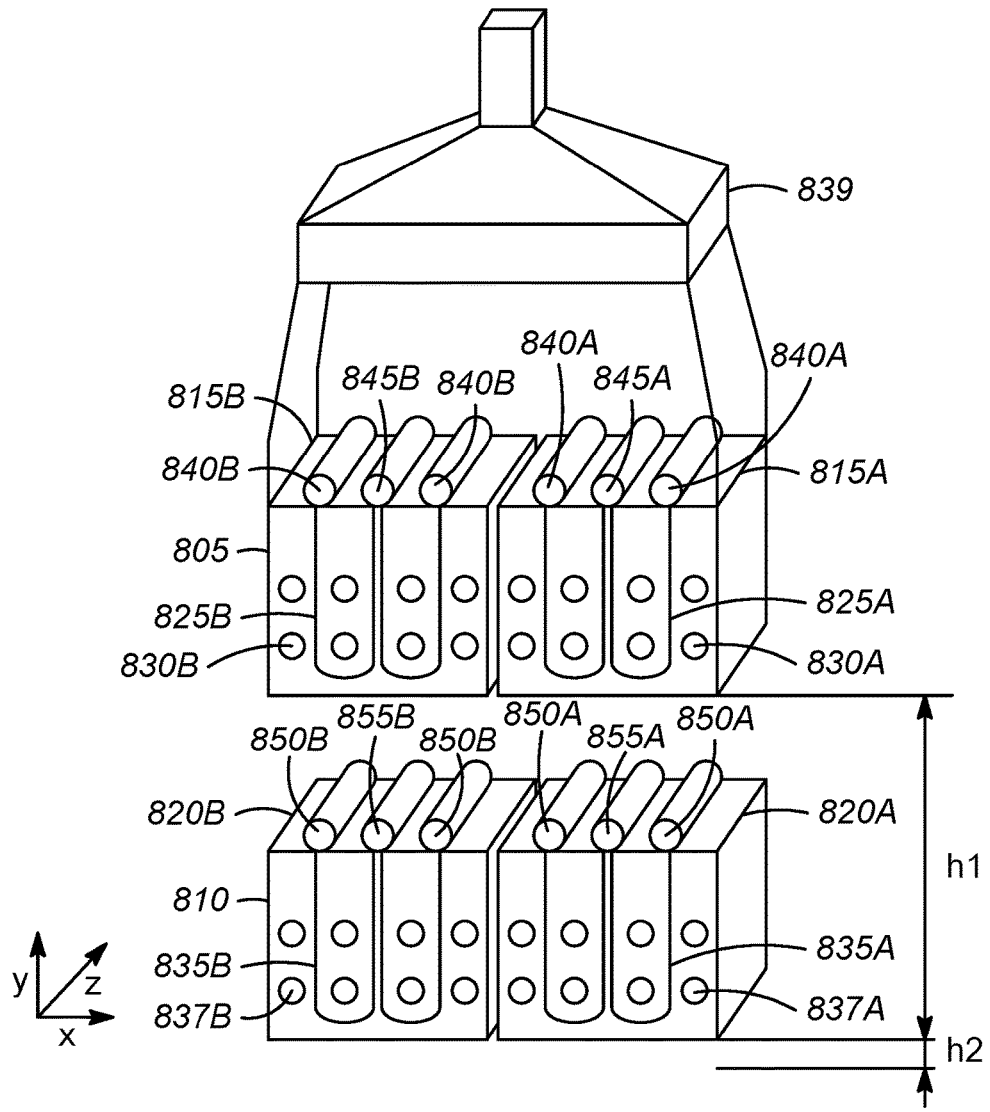
FIGS. 8A-8B illustrate a perspective view of another embodiment of a fired heater box according to the present invention and a plan view of a reforming plant using the fired heater box of FIG. 8A.
Figure 8B:
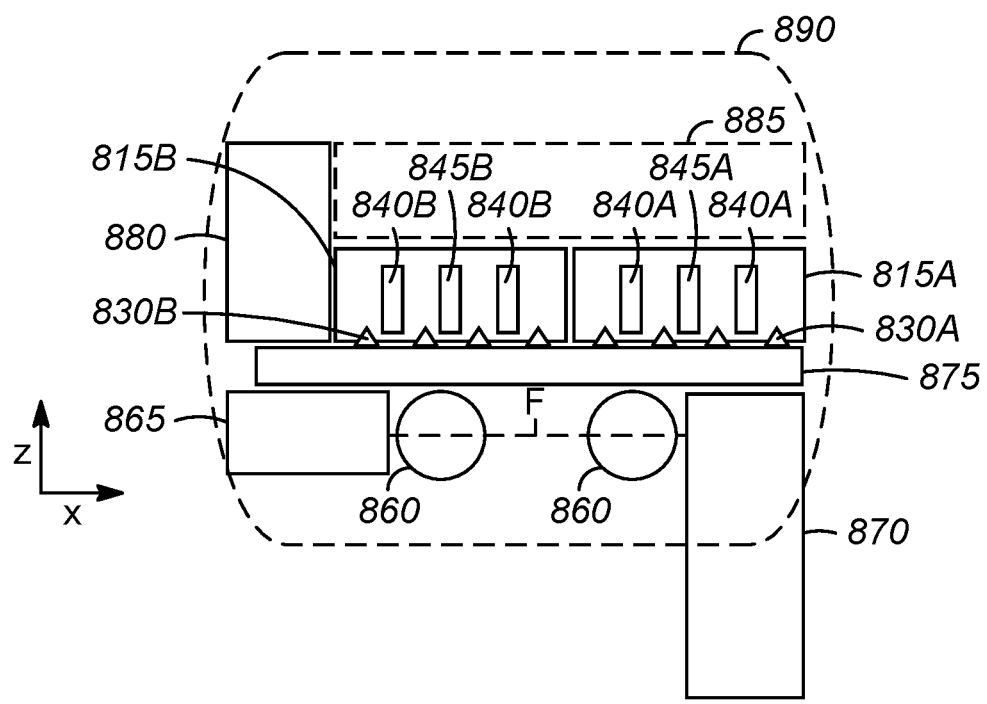

FIGS. 8A-B illustrate an embodiment similar to FIGS. 2A-B but in which the W-shaped process coil is used rather than the U-shaped process coil in FIGS. 2A-B.

In this arrangement, there are two sets 805, 810 of radiant fired heaters 815A-B, and 820A-B. The first set 805 is at a height $h_1$ (y direction) greater than the height $h_2$ of the second set 810.

The radiant fired heaters 815A-B have W-shaped process coils 825A-B and burners 830A-B, while radiant fired heaters 820A-B have W-shaped coils 835A-B and burners 837A-B. There are burners 830A-B and 837A-B at one end of the series of process coils 825A-B and 835A-B.

The convection bank 839 extends in the x direction and is perpendicular to the direction (z) of the inlet manifolds 840A-B and outlet manifolds 845A-B.

In this embodiment, the inlet manifolds 840A-B and outlet manifolds 845A-B of the first set 805, and the inlet manifolds 850A-B and outlet manifolds 855A-B of the second set 810 extend in the z direction and are perpendicular to a plane F through the reactor stacks 860.

The two reactor stacks 860 are spaced apart from one another.

The fuel gas treatment system 865, and the circulating catalyst regeneration structure 870 are on the same side of the pipe rack 875 as the reactor stacks 860.

The steam disengaging system 880 is beside the radiant fired heaters 815A-B. The tube laydown yard 885 is on the opposite side of the radiant fired heaters 815A-B from the pipe rack 875.

In this embodiment, the area of tube laydown yard 885 is narrower (z direction) but wider (x direction) than the tube laydown area in FIGS. 2A-B. The hydrocarbon exclusion zone area 890 surrounding the two sets 805, 810 of radiant fired heaters 815A-B and 820A-B is smaller than in FIGS. 2A-B.

Figure 9A:
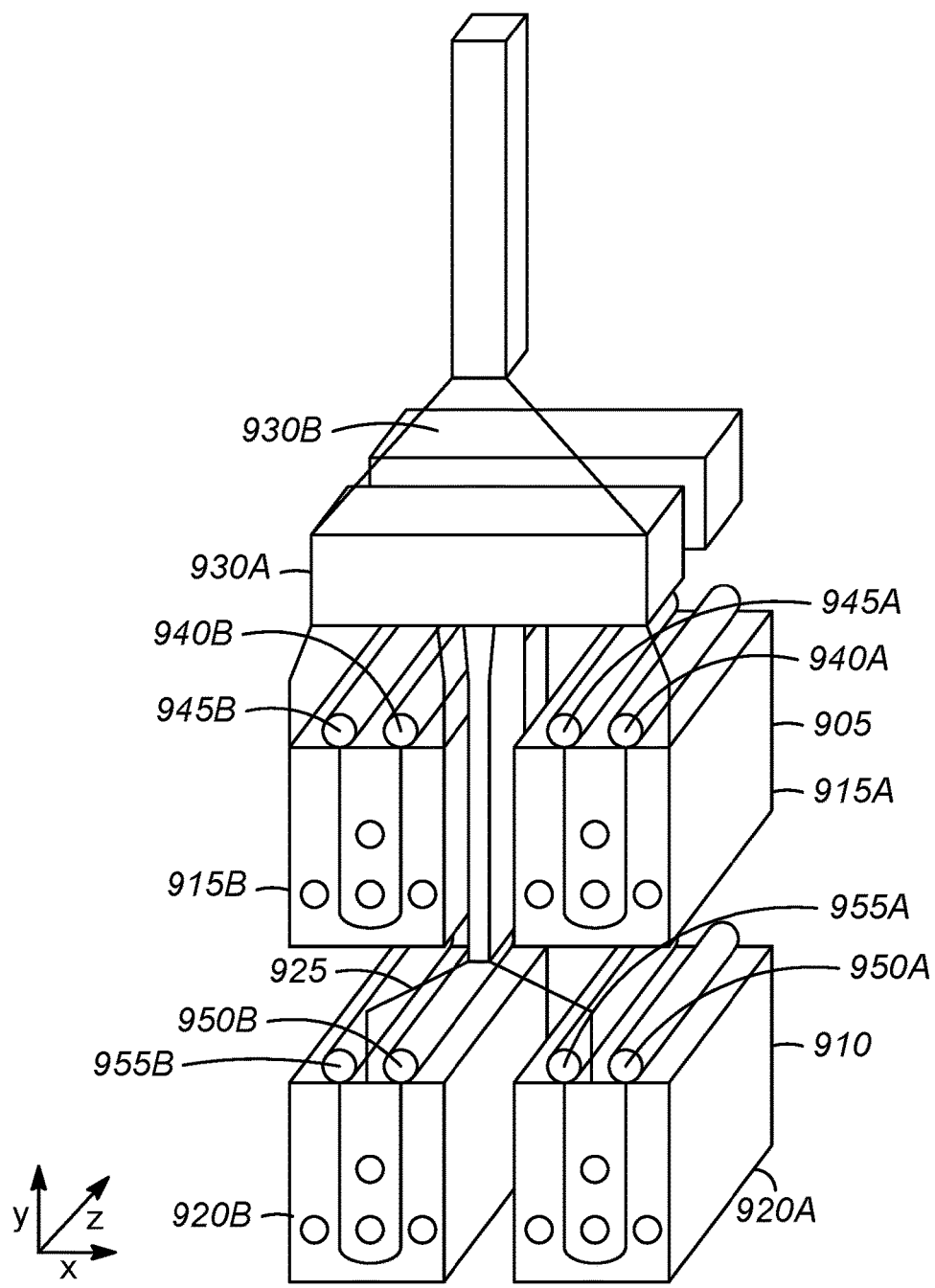
FIGS. 9A-C illustrate various arrangements of fired heaters and convection banks according to the present invention.
Figure 9B:
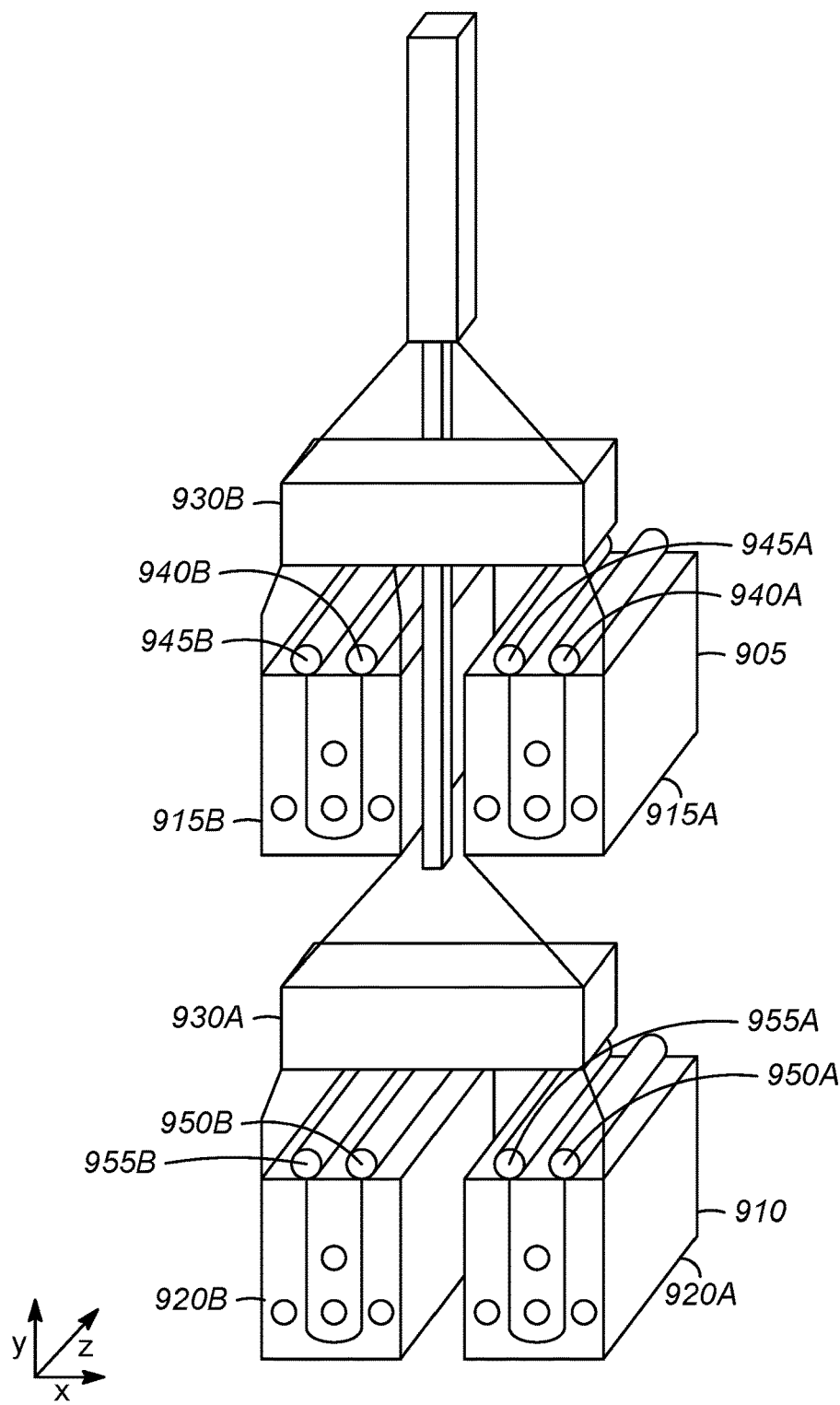
Figure 9C:
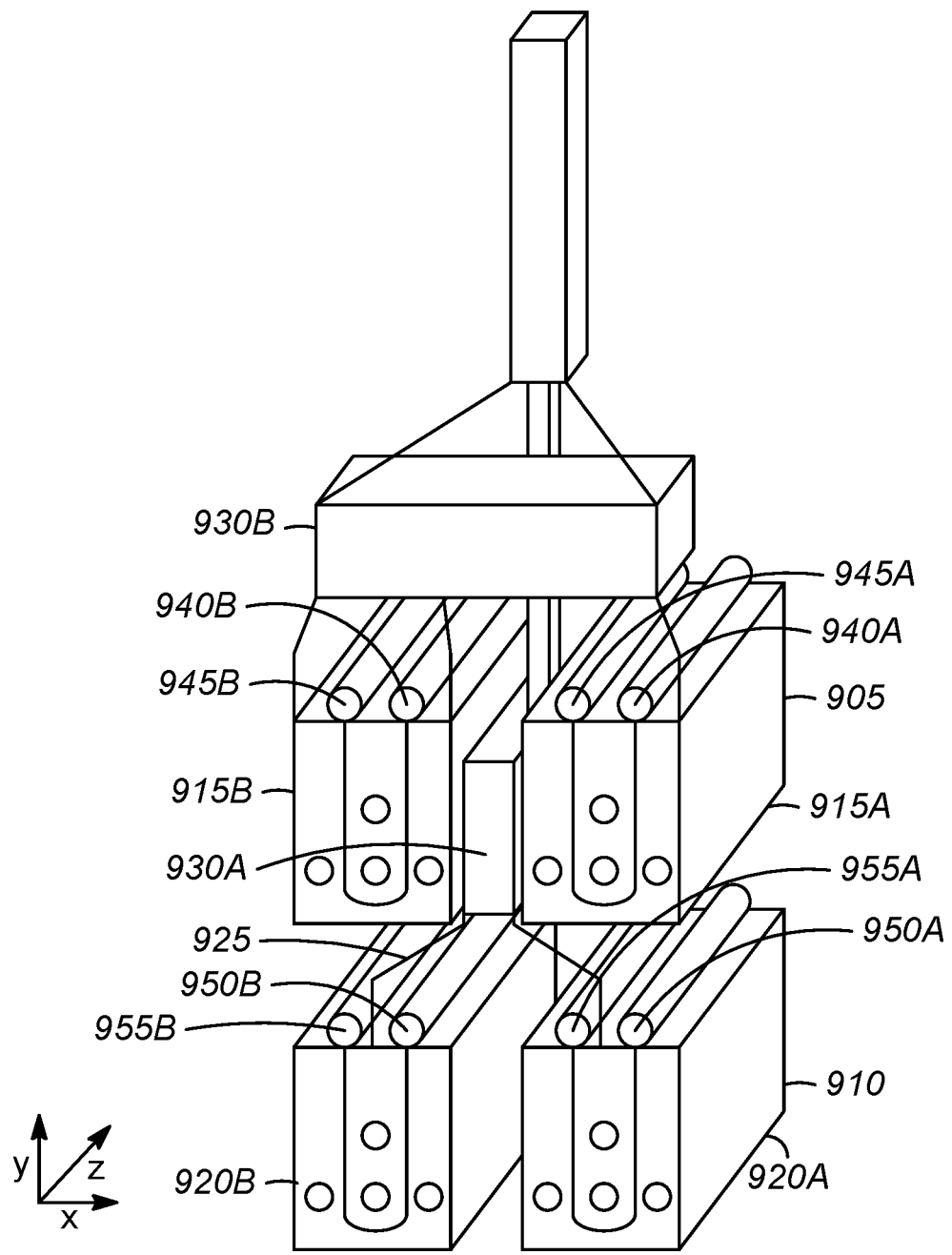

FIGS. 9A-C illustrate various arrangements of the convection bank in relation to the sets of radiant fired heaters. In FIG. 9A, there is a first set 905 of radiant fired heaters 915A-B and a second set 910 of radiant fired heaters 920A-B. The flue gas outlet 925 from the second set 910 of radiant fired heaters 920A-B extends between the radiant fired heaters 915A-B and into convection bank 930A. The flue gas from the first set 905 of radiant fired heaters 915A-B is sent to convection bank 930B. Convection bank 930A-B are located above both the first and second sets 905, 910 of radiant fired heaters 915A-B and 920A-B. Convection banks 930A-B extend in the x direction and are perpendicular to the direction (z) of the inlet manifolds 940A-B, 950A-B and outlet manifolds 945A-B, 955A-B of the first and second sets 905, 910 of radiant fired heaters 915A-B, 920A-B.

In FIG. 9B, convection bank 930A is located above the second set 910 of radiant fired heaters 920A-B and below the first set 905 of radiant fired heaters 915A-B. The flue gas from the second set 910 of radiant fired heaters 920A-B is sent to convection bank 930A. Convection bank 930B is above the first set 905 of radiant fired heaters 915A-B. The flue gas from the first set 905 of radiant fired heaters 915A-B is sent to convection bank 930B. Convection banks 930A-B extend in the x direction and are perpendicular to the direction (z) of the inlet manifolds 940A-B, 950A-B and outlet manifolds 945A-B, 955A-B of the first and second sets 905, 910 of radiant fired heaters 915A-B, 920A-B.

In FIG. 9C, convection bank 930A is located above the second set 910 of radiant fired heaters 920A-B and between the radiant fired heaters 915A and 915B. The flue gas outlet 925 from the second set 910 of radiant fired heaters 920A-B sends the flue gas into convection bank 930A. Convection bank 930A extends in the z direction and is parallel to the inlet manifolds 940A-B, 950A-B and outlet manifolds 945A-B, 955A-B of the first and second sets 905, 910 of radiant fired heaters 915A-B, 920A-B. Convection bank 930B is above the first set 905 of radiant fired heaters 915A-B. The flue gas from the first set 905 of radiant fired heaters 915A-B is sent to convection bank 930B. Convection bank 930B extends in the x direction and is perpendicular to the direction (z) of the inlet manifolds 940A-B, 950A-B and outlet manifolds 945A-B, 955A-B of the first and second sets 905, 910 of radiant fired heaters 915A-B, 920A-B.

In some embodiments, it is desirable to minimize the tube laydown area. This can be done by selecting a first arrangement of reforming reactors, and a first arrangement of stacked sets of radiant fired heaters based on the arrangement of reforming reactors. A first tube laydown area is selected based on the first arrangement of stacked sets of radiant fired heaters. A second arrangement of reforming reactors, and a second arrangement of stacked sets of radiant fired heaters based on the arrangement of reforming reactors are selected. A second tube laydown area is selected based on the arrangement of stacked sets of radiant fired heaters. This first and second tube laydown areas are then compared.

In other embodiments, it is desirable to minimize the size of the hydrocarbon exclusion zone. A similar analysis can be done. The first and second arrangements of reforming reactors, and the first and arrangements of stacked sets of radiant fired heaters based on the arrangement of reforming reactors are selected. The first and second tube laydown areas are selected based on the arrangement of stacked sets of radiant fired heaters.

The appropriate equipment arrangement can then be selected based on the tube laydown areas and the hydrocarbon exclusion zone areas and the relative importance of these two criteria.

It should be understood that one or more radiant fired heaters described herein (e.g., a charge or an interheater) can have the stream enter the radiant section then the optional convection section, may have the stream enter the optional convection section and then the radiant section, or may have the stream enter only the radiant section, depending, e.g., on the maximum tube wall temperature limitations.

Commercial fired heaters for reforming processes typically have individual radiant heat transfer sections for individual heaters and a common convective heat transfer section that may be heated by the flue gases from the radiant sections. The temperature of the combined feed stream leaving the charge heater, which may also be the inlet temperature of the first reaction zone, is generally about 482° C. to about 560° C. (about 900° F. to about 1,040° F.), preferably about 493° C. to about 549° C. (about 920° C. to about 1,020° F.).

One typical process in which the radiant fired heaters of the present invention could be used is a reforming process.

Generally, the catalytic reforming zone has at least two reformers where the reactant stream flows serially through the reformers. Reaction systems having multiple reformers generally take one of two forms: a side-by-side form or a stacked form. In the side-by-side form, multiple and separate reaction vessels, each that can include a reformer, may be placed alongside each other. In the stacked form, one common reaction vessel can contain multiple and separate reformers that may be placed on top of each other. In both reaction systems, there can be intermediate heating or cooling between the reformers, depending on whether the reactions can be endothermic or exothermic.

The feedstocks converted by these processes can include various fractions from a range of crude oils. Exemplary feedstocks converted by these processes generally include naphtha, including, but not limited to, straight run naphtha, hydrocracked naphtha, visbreaker naphtha, coker naphtha, and fluid catalytic cracked naphtha. Light naphtha including some butane, pentanes, and light hexanes may also be included in the feedstock.

Processes having multiple reaction zones may include a wide variety of hydrocarbon conversion processes such as catalytic reforming, alkylation, dealkylation, hydrogenation, dehydrogenation, hydrotreating, isomerization, dehydroisomerization, dehydrocyclization, cracking, and hydrocracking processes. Catalytic reforming also often utilizes multiple reaction zones, and will be referenced hereinafter in the embodiments depicted in the drawings. Further information on reforming processes may be found in, for example, U.S. Pat. Nos. 4,119,526; 4,409,095; and 4,440,626.

Usually, in catalytic reforming, a feedstock is admixed with a recycle stream comprising hydrogen to form what is commonly referred to as a combined feed stream, and the combined feed stream is contacted with a catalyst in a reaction zone.

Once the combined feed stream passes to the first reaction zone, the combined feed stream may undergo conversion reactions. In a common form, the reforming process can employ the catalyst particles in several reaction zones interconnected in a series flow arrangement. There may be any number of reaction zones, but usually the number of reaction zones is 3, 4 or 5. Because reforming reactions occur generally at an elevated temperature and are generally endothermic, each reaction zone usually has associated with it one or more heating zones, which heats the reactants to the desired reaction temperature.

This invention can be applicable in a reforming reaction system having at least two catalytic reaction zones where at least a portion of the reactant stream and at least a portion of the catalyst particles flow serially through the reaction zones. These reforming reaction systems can be a side-by-side form or a stacked form, as discussed above.

Generally, the reforming reactions are normally effected in the presence of catalyst particles comprised of one or more Group VIII (IUPAC 8-10) noble metals (e.g., platinum, iridium, rhodium, and palladium) and a halogen combined with a porous carrier, such as a refractory inorganic oxide. U.S. Pat. No. 2,479,110, for example, teaches an alumina-platinum-halogen reforming catalyst. Although the catalyst may contain about 0.05 to about 2.0 wt-% of Group VIII metal, a less expensive catalyst, such as a catalyst containing about 0.05 to about 0.5 wt-% of Group VIII metal may be used. The preferred noble metal is platinum. In addition, the catalyst may contain indium and/or a lanthanide series metal such as cerium. The catalyst particles may also contain about 0.05 to about 0.5 wt-% of one or more Group IVA (IUPAC 14) metals (e.g., tin, germanium, and lead), such as described in U.S. Pat. Nos. 4,929,333, 5,128,300, and the references cited therein. The halogen is typically chlorine, and alumina is commonly the carrier. Suitable alumina materials include, but are not limited to, gamma, eta, and theta alumina. One property related to the performance of the catalyst is the surface area of the carrier. Preferably, the carrier has a surface area of about 100 to about 500 m$^2$/g. The activity of catalysts having a surface area of less than about 130 m$^2$/g tend to be more detrimentally affected by catalyst coke than catalysts having a higher surface area. Generally, the particles are usually spheroidal and have a diameter of about 1.6 to about 3.1 mm (about 1/16 to about 1/8 inch), although they may be as large as about 6.35 mm (about 1/4 inch) or as small as about 1.06 mm (about 1/24 inch). In a particular reforming reaction zone, however, it is desirable to use catalyst particles which fall in a relatively narrow size range. A preferred catalyst particle diameter is about 1.6 mm (about 1/16 inch).

A reforming process can employ a fixed catalyst bed, or a moving bed reaction vessel and a moving bed regeneration vessel. In the latter, generally regenerated catalyst particles are fed to the reaction vessel, which typically includes several reaction zones, and the particles flow through the reaction vessel by gravity. Catalyst may be withdrawn from the bottom of the reaction vessel and transported to the regeneration vessel. In the regeneration vessel, a multi-step regeneration process is typically used to regenerate the catalyst to restore its full ability to promote reforming reactions. U.S. Pat. Nos. 3,652,231; 3,647,680 and 3,692,496 describe catalyst regeneration vessels that are suitable for use in a reforming process. Catalyst can flow by gravity through the various regeneration steps and then be withdrawn from the regeneration vessel and transported to the reaction vessel. Generally, arrangements are provided for adding fresh catalyst as make-up to and for withdrawing spent catalyst from the process. Movement of catalyst through the reaction and regeneration vessels is often referred to as continuous though, in practice, it is semicontinuous. By semicontinuous movement, it is meant the repeated transfer of relatively small amounts of catalyst at closely spaced points in time. For example, one batch every twenty minutes may be withdrawn from the bottom of the reaction vessel and withdrawal may take five minutes, that is, catalyst can flow for five minutes. If the catalyst inventory in a vessel is relatively large in comparison with this batch size, the catalyst bed in the vessel may be considered to be continuously moving. A moving bed system can have the advantage of maintaining production while the catalyst is removed or replaced.

Typically, the rate of catalyst movement through the catalyst beds may range from as little as about 45.5 kg (about 100 pounds) per hour to about 2,722 kg (about 6,000 pounds) per hour, or more.

The reaction zones of the present invention can be operated at reforming conditions, which include a range of pressures generally from atmospheric pressure of about 0 to about 6,895 kPa(g) (about 0 psi(g) to about 1,000 psi(g)), with particularly good results obtained at the relatively low pressure range of 276 to about 1,379 kPa(g) (about 40 to about 200 psi(g)). The overall liquid hourly space velocity (LHSV) based on the total catalyst volume in all of the reaction zones is generally about 0.1 to about 10 $hr^{-1}$, or about 1 to about 5 $hr^{-1}$, and or about 1.5 to about 2.0 $hr^{-1}$.

As mentioned previously, generally naphthene reforming reactions that are endothermic occur in the first reaction zone, and thus the outlet temperature of the first reaction zone can be less than the inlet temperature of the first reaction zone and is generally about 316 to about 454° C. (about 600 to about 850° F.). The first reaction zone may contain generally about 5%-about 50%, and more usually about 10%-about 30%, of the total catalyst volume in all of the reaction zones. Consequently, the liquid hourly space velocity (LHSV) in the first reaction zone, based on the catalyst volume in the first reaction zone, can be generally 0.2-200 $hr^{-1}$, or about 2 to about 100 $hr^{-1}$, or about 5 to about 20 $hr^{-1}$. Generally, the catalyst particles are withdrawn from the first reaction zone and passed to the second reaction zone; such particles generally have a coke content of less than about 2 wt-% based on the weight of catalyst.

Because of the endothermic reforming reactions that occur in the first reaction zone, generally the temperature of the effluent of the first reaction zone falls not only to less than the temperature of the combined feed to the first reaction zone, but also to less than the desired inlet temperature of the second reaction zone. Therefore, the effluent of the first reaction zone can pass through another heater, which is commonly referred to as the first interheater, and which can heat the first reaction zone effluent to the desired inlet temperature of the second reaction zone.

Generally, a heater is referred to as an interheater when it is located between two reaction zones, such as the first and second reaction zones. The first reaction zone effluent stream leaves the interheater at a temperature of generally about 482 to about 560° C. (about 900 to about 1,040° F.). Accounting for heat losses, the interheater outlet temperature is generally not more than about 5° C. (about 10° F.), and preferably not more than about 1° C. (about 2° F.), more than the inlet temperature of the second reaction zone. Accordingly, the inlet temperature of the second reaction zone is generally about 482° C. to about 560° C. (about 900° F. to about 1,040° F.), or 493° C. to about 549° C. (about 920° F. to about 1,020° F.). The inlet temperature of the second reaction zone is usually at least about 33° C. (about 60° F.) greater than the inlet temperature of the first reaction zone, and may be at least about 56° C. (about 100° F.) or even at least about 83° C. (about 150° F.) higher than the first reaction zone inlet temperature.

On exiting the first interheater, generally the first reaction zone effluent enters the second reaction zone. As in the first reaction zone, the endothermic reactions can cause another decline in temperature across the second reaction zone. Generally, however, the temperature decline across the second reaction zone is less than the temperature decline across the first reaction zone, because the reactions that occur in the second reaction zone are generally less endothermic than the reactions that occur in the first reaction zone. Despite the somewhat lower temperature decline across the second reaction zone, the effluent of the second reaction zone is nevertheless still at a temperature that is less than the desired inlet temperature of the third reaction zone.

The second reaction zone generally includes about 10%-about 60%, and more usually about 15% to about 40%, of the total catalyst volume in all of the reaction zones. Consequently, the liquid hourly space velocity (LHSV) in the second reaction zone, based on the catalyst volume in the second reaction zone, is generally about 0.13 to about 134 $hr^{-1}$, preferably about 1.3 to about 67 $hr^{-1}$, and more preferably about 3.3 to about 13.4 $hr^{-1}$.

The second reaction zone effluent can pass a second interheater (the first interheater being the previously described interheater between the first and the second reaction zones), and after heating, can pass to a third reaction zone. However, one or more additional heaters and/or reaction zones after the second reaction zone can be omitted; that is, the second reaction zone may be the last reaction zone in the train. The third reaction zone contains generally about 25%-about 75%, and more usually about 30% to about 50%, of the total catalyst volume in all of the reaction zones. Likewise, the third reaction zone effluent can pass to a third interheater and from there to a fourth reaction zone. The fourth reaction zone contains generally about 30% to about 80%, and more usually about 40% to about 50%, of the total catalyst volume in all of the reaction zones. The inlet temperatures of the third, fourth, and subsequent reaction zones are generally about 482 to about 560° C. (about 900 to about 1,040° F.), preferably about 493 to about 549° C. (about 920 to about 1,020° F.).

Because the reforming reactions that occur in the second and subsequent (i.e., third and fourth) reaction zones are generally less endothermic than those that occur in the first reaction zone, the temperature drop that occurs in the later reaction zones is generally less than that which occurs in the first reaction zone. Thus, the outlet temperature of the last reaction zone may be about 11° C. (about 20° F.) or less below the inlet temperature of the last reaction zone, and indeed may conceivably be higher than the inlet temperature of the last reaction zone.

The desired reformate octane of the $C_{5+}$ fraction of the reformate is generally about 85 to about 107 clear research octane number ($C_{5+}$ RONC), and preferably about 98 to about 102 $C_{5+}$ RONC.

Moreover, any inlet temperature profiles can be utilized with the above-described reaction zones. The inlet temperature profiles can be flat or skewed, such as ascending, descending, hill-shaped, or valley-shaped.

The last reaction zone effluent stream can be cooled in the combined feed heat exchanger by transferring heat to the combined feed stream. After leaving the combined feed heat exchanger, the cooled last reaction zone effluent passes to a product recovery section. Suitable product recovery sections are known to persons of ordinary skill in the art of reforming. Exemplary product recovery facilities generally include gas-liquid separators for separating hydrogen and $C_1$ through $C_3$ hydrocarbon gases from the last reaction zone effluent stream, and fractionation columns for separating at least a portion of the $C_4$ to $C_5$ light hydrocarbons from the remainder of the reformate. In addition, the reformate may be separated by distillation into a light reformate fraction and a heavy reformate fraction.

During the course of a reforming reaction with a moving catalyst bed, catalyst particles become deactivated as a result of mechanisms such as the deposition of coke on the particles; that is, after a period of time in use, the ability of catalyst particles to promote reforming reactions decreases to the point that the catalyst is no longer useful. The catalyst can be reconditioned, or regenerated, before it is reused in a reforming process.

While general reforming conditions have been described, those of skill in the art will recognize that the reforming conditions can be varied as needed Furthermore, those of skill in the art will recognize that the radiant fired heater arrangements could be used with other processes.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

SPECIFIC EMBODIMENTS

While the following is described in conjunction with specific embodiments, it will be understood that this description is intended to illustrate and not limit the scope of the preceding description and the appended claims.

A first embodiment of the invention is an apparatus comprising at least two sets of radiant fired heaters, the first set of radiant fired heaters being at a first height, the second set of radiant fired heaters being at a second height less than the first height, each set of radiant fired heaters comprising at least one radiant fired heater, each radiant fired heater having at least one process coil disposed within the radiant fired heater, burners, and a flue gas outlet, wherein the process coils have one outlet and at least one inlet; at least one inlet manifold having an inlet and multiple outlets for each radiant heater, with each outlet of the at least one inlet manifold in fluid communication with one process coil inlet; and an outlet manifold having multiple inlets and an outlet for each radiant heater, with the multiple inlets of the outlet manifold in fluid communication with the process coil outlets. An embodiment of the invention is one, any or all of prior embodiments in this paragraph up through the first embodiment in this paragraph wherein there are at least two process coils disposed in the first or second set of radiant fired heaters, and wherein at least one process coil extends below the plane of the outlet manifold and wherein at least one process coil extends above the plane of the outlet manifold. An embodiment of the invention is one, any or all of prior embodiments in this paragraph up through the first embodiment in this paragraph wherein the inlet and outlet manifolds of the second set of radiant fired heaters are above the at least one process coil of the second set of radiant fired heaters and wherein the inlet and outlet manifolds of the first set of radiant fired heaters are below the at least one process coil of the first set of radiant fired heaters. An embodiment of the invention is one, any or all of prior embodiments in this paragraph up through the first embodiment in this paragraph wherein each process coil has a U-shaped configuration and wherein there is one inlet manifold. An embodiment of the invention is one, any or all of prior embodiments in this paragraph up through the first embodiment in this paragraph further comprising a convection bank having an inlet and heating tubes, wherein the inlet of the convection bank is in fluid communication with the flue gas outlet of the first set of radiant fired heaters, the second set of radiant fired heaters, or both. An embodiment of the invention is one, any or all of prior embodiments in this paragraph up through the first embodiment in this paragraph where the flue gas outlet of at least one of the radiant fired heaters in the second set is positioned outside the first set of radiant fired heaters. An embodiment of the invention is one, any or all of prior embodiments in this paragraph up through the first embodiment in this paragraph where the flue gas outlet of at least one of the radiant fired heaters in the second set is positioned between the radiant fired heaters in the first set. An embodiment of the invention is one, any or all of prior embodiments in this paragraph up through the first embodiment in this paragraph wherein a direction of the inlet and outlet manifolds of the radiant fired heaters in the first set is parallel to a direction of the convection bank. An embodiment of the invention is one, any or all of prior embodiments in this paragraph up through the first embodiment in this paragraph wherein a direction of the inlet and outlet manifolds of the radiant fired heater in the first set is perpendicular to a direction of the convection bank. An embodiment of the invention is one, any or all of prior embodiments in this paragraph up through the first embodiment in this paragraph wherein there are two inlet manifolds for each radiant heater, and wherein each process coil has a W-shaped configuration. An embodiment of the invention is one, any or all of prior embodiments in this paragraph up through the first embodiment in this paragraph wherein the W-shaped configuration comprises three tubes in a parallel orientation, with two semi-circular tubular sections connecting the ends of the tubes, such that the tubes and tubular sections form the W-shaped configuration, with the central tube having one end connected to the inlet of the manifold outlet, one outer tube having one end connected to the outlet of the first inlet manifold, and the other outer tube having one end connected to the outlet of the second inlet manifold. An embodiment of the invention is one, any or all of prior embodiments in this paragraph up through the first embodiment in this paragraph wherein the burners are at one end of the radiant fired heater and wherein the inlets of the inlet manifolds and the outlet of the outlet manifold of the radiant fired heater are adjacent to the end of the radiant fired heaters where the burners are located. An embodiment of the invention is one, any or all of prior embodiments in this paragraph up through the first embodiment in this paragraph wherein the burners are at one end of the radiant fired heater and wherein the inlets of the inlet manifolds and the outlet of the outlet manifold of the radiant fired heater are adjacent to the opposite end of the radiant fired heater from where the burners are located. An embodiment of the invention is one, any or all of prior embodiments in this paragraph up through the first embodiment in this paragraph further comprising a plurality of reactors, each reactor having a process fluid inlet and a process fluid outlet, the process fluid inlet of each reactor being in fluid communication with the outlet of the outlet manifold of one of the radiant fired heaters and the process fluid outlet being in fluid communication with the inlet of the at least one inlet manifold of another one of the reactors, wherein there is one radiant fired heater for each reactor. An embodiment of the invention is one, any or all of prior embodiments in this paragraph up through the first embodiment in this paragraph wherein at least two of the reactors are stacked vertically.

A second embodiment of the invention is an apparatus comprising a plurality of reactors, each reactor having a process fluid inlet and a process fluid outlet; at least two sets of radiant fired heaters, the first set of radiant fired heaters being at a first height, the second set of radiant fired heaters being at a second height less than the first height, each set of radiant fired heaters comprising at least two radiant fired heaters, each radiant fired heater having at least one process coil disposed within the heater, burners, and a flue gas outlet, wherein the process coils have one outlet and at least one inlet; at least one inlet manifold having an inlet and multiple outlets, with each outlet of the at least one inlet manifold in fluid communication with one process coil inlet; and an outlet manifold having multiple inlets and an outlet, with the multiple inlets of the outlet manifold in fluid communication with the process coil outlets; the process fluid inlet of each reactor being in fluid communication with the outlet of the outlet manifold of one of the radiant fired heaters and the process fluid outlet being in fluid communication with the inlet of the at least one inlet manifold of another one of the reactors. An embodiment of the invention is one, any or all of prior embodiments in this paragraph up through the second embodiment in this paragraph further comprising a convection bank having an inlet and heating tubes, wherein the inlet of the convection bank is in fluid communication with the flue gas outlet of the first set of radiant fired heaters, the second set of radiant fired heaters, or both, and wherein a direction of the inlet and outlet manifolds of the radiant fired heaters in the first set is parallel to a direction of the convection bank. An embodiment of the invention is one, any or all of prior embodiments in this paragraph up through the second embodiment in this paragraph wherein the burners are at one end of the radiant fired heater and wherein the inlets of the inlet manifolds and the outlet of the outlet manifold of the radiant fired heater are adjacent to the end of the radiant fired heaters where the burners are located. An embodiment of the invention is one, any or all of prior embodiments in this paragraph up through the second embodiment in this paragraph wherein the burners are at one end of the radiant fired heater and wherein the inlets of the inlet manifolds and the outlet of the outlet manifold of the radiant fired heater are adjacent to the opposite end of the radiant fired heaters from where the burners are located.

A third embodiment of the invention is a method of selecting an apparatus arrangement comprising selecting a first arrangement of reactors; selecting a first arrangement of stacked sets of radiant fired heaters based on the first arrangement of reactors; selecting a first tube laydown area based on the first arrangement of stacked sets of radiant fired heaters; determining a first hydrocarbon exclusion zone area based on the first arrangement of stacked sets of radiant fired heaters; selecting a second arrangement of reactors; selecting a second arrangement of stacked sets of radiant fired heaters based on the second arrangement of reactors; selecting a second tube laydown area based on the second arrangement of stacked sets of radiant fired heaters; determining a second hydrocarbon exclusion zone area based on the second arrangement of stacked sets of radiant fired heaters; comparing the first tube laydown area to the second tube laydown area, and the first hydrocarbon exclusion zone area to the second hydrocarbon exclusion zone area; and selecting the apparatus arrangement based on the first and second tube laydown areas and the first and second hydrocarbon exclusion zone areas.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. An apparatus comprising:
    at least two sets of radiant fired heaters, the first set being at a first height, the second set being at a second height less than the first height, the first set being positioned above the second set, each set of the at least two sets of radiant fired heaters comprising at least one radiant fired heater, each radiant fired heater having at least one process coil disposed within the radiant fired heater, burners, and a flue gas outlet, wherein the process coils have one outlet and at least one inlet;
    at least one inlet manifold having an inlet and multiple outlets for each radiant heater, with each outlet of the at least one inlet manifold in fluid communication with one process coil inlet; and
    an outlet manifold having multiple inlets and an outlet for each radiant heater, with the multiple inlets of the outlet manifold in fluid communication with the process coil outlets.

2. The apparatus of claim 1 wherein there are at least two process coils disposed in one of the radiant fired heaters in first or second set of radiant fired heaters, and wherein at least one process coil extends below a plane of the outlet manifold and wherein at least one process coil extends above the plane of the outlet manifold for the one of the radiant fired heaters.

3. The apparatus of claim 1 wherein the inlet and outlet manifolds of the second set of radiant fired heaters are above the at least one process coil of the second set of radiant fired heaters and wherein the inlet and outlet manifolds of the first set of radiant fired heaters are below the at least one process coil of the first set of radiant fired heaters.

4. The apparatus of claim 1 wherein each process coil has a U-shaped configuration and wherein there is one inlet manifold.

5. The apparatus of claim 1 further comprising a convection bank having an inlet and heating tubes, wherein the inlet of the convection bank is in fluid communication with the flue gas outlet of the first set of radiant fired heaters, the second set of radiant fired heaters, or both.

6. The apparatus of claim 5 where the flue gas outlet of at least one of the radiant fired heaters in the second set is positioned outside the first set of radiant fired heaters.

7. The apparatus of claim 5 where the flue gas outlet of at least one of the radiant fired heaters in the second set is positioned between the radiant fired heaters in the first set.

8. The apparatus of claim 5 wherein a direction of the inlet and outlet manifolds of the radiant fired heaters in the first set is parallel to a direction of the convection bank.

9. The apparatus of claim 5 wherein a direction of the inlet and outlet manifolds of the radiant fired heater in the first set is perpendicular to a direction of the convection bank.

10. The apparatus of claim 1 wherein there are two inlet manifolds for each radiant heater, and wherein each process coil has a W-shaped configuration.

11. The apparatus of claim 10 wherein the W-shaped configuration comprises three tubes in a parallel orientation, with two semi-circular tubular sections connecting the ends of the tubes, such that the tubes and tubular sections form the W-shaped configuration, with the central tube having one end connected to the inlet of the manifold outlet, one outer tube having one end connected to the outlet of the first inlet manifold, and the other outer tube having one end connected to the outlet of the second inlet manifold.

12. The apparatus of claim 1 wherein the burners are at one end of one of the radiant fired heaters and wherein the inlets of the inlet manifolds and the outlet of the outlet manifold of the one of the radiant fired heaters are adjacent to the end of the one of the radiant fired heaters where the burners are located.

13. The apparatus of claim 1 wherein the burners are at one end of one of the radiant fired heaters and wherein the inlets of the inlet manifolds and the outlet of the outlet manifold of the one of the radiant fired heaters are adjacent to the opposite end of the one of the radiant fired heaters from where the burners are located.

14. The apparatus of claim 1 further comprising a plurality of reactors, each reactor having a process fluid inlet and a process fluid outlet, the process fluid inlet of each reactor being in fluid communication with the outlet of the outlet manifold of one of the radiant fired heaters and the process fluid outlet being in fluid communication with the inlet of the at least one inlet manifold of another one of the reactors, wherein there is one radiant fired heater for each reactor.

15. The apparatus of claim 14 wherein at least two of the reactors are stacked vertically.

16. An apparatus comprising:
a plurality of reactors, each reactor having a process fluid inlet and a process fluid outlet;
at least two sets of radiant fired heaters, the first set of radiant fired heaters being at a first height, the second set of radiant fired heaters being at a second height less than the first height, each set of radiant fired heaters comprising at least two radiant fired heaters, each radiant fired heater having at least one process coil disposed within the heater, burners, and a flue gas outlet, wherein the process coils have one outlet and at least one inlet;
at least one inlet manifold having an inlet and multiple outlets, with each outlet of the at least one inlet manifold in fluid communication with one process coil inlet; and
an outlet manifold having multiple inlets and an outlet, with the multiple inlets of the outlet manifold in fluid communication with the process coil outlets;
the process fluid inlet of each reactor being in fluid communication with the outlet of the outlet manifold of one of the radiant fired heaters and the process fluid outlet being in fluid communication with the inlet of the at least one inlet manifold of another one of the reactors.

17. The apparatus of claim 15 further comprising a convection bank having an inlet and heating tubes, wherein the inlet of the convection bank is in fluid communication with the flue gas outlet of the first set of radiant fired heaters, the second set of radiant fired heaters, or both, and wherein a direction of the inlet and outlet manifolds of the radiant fired heaters in the first set is parallel to a direction of the convection bank.

18. The apparatus of claim 15 wherein the burners are at one end of the radiant fired heaters and wherein the inlets of the inlet manifolds and the outlet of the outlet manifold of the one of the radiant fired heaters are adjacent to the end of the one of the radiant fired heaters where the burners are located.

19. The apparatus of claim 15 wherein the burners are at one end of one of the radiant fired heaters and wherein the inlets of the inlet manifolds and the outlet of the outlet manifold of the one of the radiant fired heaters are adjacent to the opposite end of the one of the radiant fired heaters from where the burners are located.

20. A method of selecting an apparatus arrangement comprising:
selecting a first arrangement of reactors;
selecting a first arrangement of stacked sets of radiant fired heaters based on the first arrangement of reactors;
selecting a first tube laydown area based on the first arrangement of stacked sets of radiant fired heaters;
determining a first hydrocarbon exclusion zone area based on the first arrangement of stacked sets of radiant fired heaters;
selecting a second arrangement of reactors;
selecting a second arrangement of stacked sets of radiant fired heaters based on the second arrangement of reactors;
selecting a second tube laydown area based on the second arrangement of stacked sets of radiant fired heaters;
determining a second hydrocarbon exclusion zone area based on the second arrangement of stacked sets of radiant fired heaters;
comparing the first tube laydown area to the second tube laydown area, and the first hydrocarbon exclusion zone area to the second hydrocarbon exclusion zone area; and
selecting the apparatus arrangement based on the first and second tube laydown areas and the first and second hydrocarbon exclusion zone areas.

* * * * *